(12) United States Patent
Hayashi et al.

(10) Patent No.: US 11,801,480 B2
(45) Date of Patent: Oct. 31, 2023

(54) HOLLOW-FIBER MEMBRANE AND HOLLOW-FIBER MEMBRANE MODULE

(71) Applicant: SUMITOMO ELECTRIC FINE POLYMER, INC., Osaka (JP)

(72) Inventors: Fumihiro Hayashi, Osaka (JP); Yasuhiko Muroya, Osaka (JP); Takamasa Hashimoto, Osaka (JP); Atsushi Uno, Osaka (JP); Yoshimasa Suzuki, Osaka (JP)

(73) Assignee: SUMITOMO ELECTRIC FINE POLYMER, INC., Osaka (JP)

( * ) Notice: Subject to any disclaimer, the term of this patent is extended or adjusted under 35 U.S.C. 154(b) by 330 days.

(21) Appl. No.: 17/285,500

(22) PCT Filed: Sep. 6, 2019

(86) PCT No.: PCT/JP2019/035172
§ 371 (c)(1),
(2) Date: Apr. 15, 2021

(87) PCT Pub. No.: WO2020/084930
PCT Pub. Date: Apr. 30, 2020

(65) Prior Publication Data
US 2021/0379537 A1 Dec. 9, 2021

(30) Foreign Application Priority Data

Oct. 24, 2018 (JP) ................... 2018-200362

(51) Int. Cl.
*B01D 69/08* (2006.01)
*B01D 19/00* (2006.01)
(Continued)

(52) U.S. Cl.
CPC ....... *B01D 69/081* (2013.01); *B01D 19/0031* (2013.01); *B01D 63/04* (2013.01);
(Continued)

(58) Field of Classification Search
None
See application file for complete search history.

(56) References Cited

U.S. PATENT DOCUMENTS

| | | | |
|---|---|---|---|
| 2004/0154986 A1* | 8/2004 | Cheng | B01D 67/0095 210/650 |
| 2009/0029136 A1 | 1/2009 | Hayashi et al. | |
| 2010/0203310 A1 | 8/2010 | Hayashi et al. | |

FOREIGN PATENT DOCUMENTS

| | | | | |
|---|---|---|---|---|
| CN | 101501113 A | 8/2009 | | |
| CN | 102740955 A | * 10/2012 | ............. | B01D 61/22 |

(Continued)

*Primary Examiner* — Krishnan S Menon
(74) *Attorney, Agent, or Firm* — Faegre Drinker Biddle & Reath LLP

(57) ABSTRACT

A hollow-fiber membrane according to an aspect of the present disclosure contains a polytetrafluoroethylene or a modified polytetrafluoroethylene as a main component and has an average outer diameter of 1 mm or less and an average inner diameter of 0.5 mm or less. In a measurement of a heat of fusion of the polytetrafluoroethylene or the modified polytetrafluoroethylene with a differential scanning calorimeter, when the polytetrafluoroethylene or modified polytetrafluoroethylene is subjected to a first step of heating from room temperature to 365° C., a second step of cooling from 365° C. to 350° C., maintaining the temperature, subsequently cooling from 350° C. to 330° C., and further cooling from 330° C. to 305° C., and a third step of cooling from 305° C. to 245° C. at a rate of −50° C./min and subsequently heating from 245° C. to 365° C. at a rate of 10° C./min, a heat of fusion from 296° C. to 343° C. in the third step is 30.0 J/g or more and 45.0 J/g or less.

7 Claims, 4 Drawing Sheets

(51) Int. Cl.
  *B01D 63/04* (2006.01)
  *B01D 67/00* (2006.01)
  *B01D 69/02* (2006.01)
  *B01D 71/36* (2006.01)
  *C02F 1/20* (2023.01)

(52) U.S. Cl.
  CPC ....... *B01D 67/002* (2013.01); *B01D 67/0027* (2013.01); *B01D 69/02* (2013.01); *B01D 71/36* (2013.01); *C02F 1/20* (2013.01); *B01D 2315/10* (2013.01); *B01D 2319/04* (2013.01); *B01D 2323/08* (2013.01); *B01D 2323/14* (2013.01); *B01D 2325/02* (2013.01)

(56) References Cited

FOREIGN PATENT DOCUMENTS

| | | |
|---|---|---|
| JP | 2007-077323 A | 3/2007 |
| JP | 2010-094579 A | 4/2010 |
| JP | 2011-036743 A | 2/2011 |

\* cited by examiner

HOLLOW-FIBER MEMBRANE AND HOLLOW-FIBER MEMBRANE MODULE

TECHNICAL FIELD

The present disclosure relates to a hollow-fiber membrane and a hollow-fiber membrane module. The present application claims priority from Japanese Patent Application No. 2018-200362 filed on Oct. 24, 2018, and the entire contents of the Japanese patent application are incorporated herein by reference.

BACKGROUND ART

Hollow-fiber membrane modules that remove a gas such as oxygen dissolved in a liquid are used in, for example, semiconductor manufacturing processes, printers, liquid crystal enclosure processes, and chemical liquid manufacturing processes. For example, a hollow-fiber membrane containing a tetrafluoroethylene resin (hereinafter, also referred to as a PTFE) as a main component has been proposed as a hollow-fiber membrane for such a hollow-fiber membrane module (refer to Japanese Unexamined Patent Application Publication No. 2011-36743).

CITATION LIST

Patent Literature

PTL 1: Japanese Unexamined Patent Application Publication No. 2011-36743

SUMMARY OF INVENTION

A hollow-fiber membrane according to an aspect of the present disclosure contains a polytetrafluoroethylene or a modified polytetrafluoroethylene as a main component, in which the hollow-fiber membrane has an average outer diameter of 1 mm or less and an average inner diameter of 0.5 mm or less, and in a measurement of a heat of fusion of the polytetrafluoroethylene or the modified polytetrafluoroethylene with a differential scanning calorimeter, when the polytetrafluoroethylene or the modified polytetrafluoroethylene is subjected to a first step of heating from room temperature to 245° C. at a rate of 50° C./min and subsequently heating from 245° C. to 365° C. at a rate of 10° C./min, a second step of cooling from 365° C. to 350° C. at a rate of −10° C./min, maintaining the temperature, subsequently cooling from 350° C. to 330° C. at a rate of −10° C./min, and further cooling from 330° C. to 305° C. at a rate of −1° C./min, and a third step of cooling from 305° C. to 245° C. at a rate of −50° C./min and subsequently heating from 245° C. to 365° C. at a rate of 10° C./min, a heat of fusion from 296° C. to 343° C. in the third step is 30.0 J/g or more and 45.0 J/g or less.

A hollow-fiber membrane module according to another aspect of the present disclosure is a hollow-fiber membrane module capable of removing a gas dissolved in a liquid, the hollow-fiber membrane module including a casing and a plurality of hollow-fiber membranes aligned in one direction, the hollow-fiber membranes each being the above-described hollow-fiber membrane, in which a packing ratio of the hollow-fiber membranes to the casing is 15% or more and 80% or less.

DESCRIPTION OF EMBODIMENTS

Figure 1:
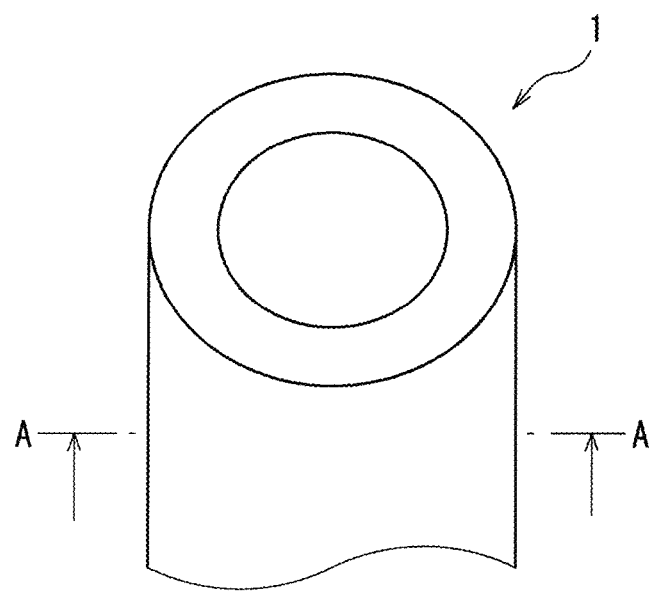
FIG. 1 is a schematic perspective view illustrating a hollow-fiber membrane according to an embodiment of the present disclosure.

Problems to be Solved by Present Disclosure

Hollow-fiber membranes included in existing hollow-fiber membrane modules are required to have an improved porosity while having a reduced hole diameter from the viewpoint of making the hollow-fiber membranes compact and from the viewpoint of increasing the separation performance per volume. In particular, from the viewpoint of increasing the degassing performance, an improvement in a bubble point, which is used as an index of the degassing performance, has been required.

To enhance the bubble point, when a PTFE having a high molecular weight is used as a raw material, fibrillation is accelerated by paste extrusion, and thus a tube having a fine pore diameter can be produced through an expansion step and a sintering step. However, the fibrillation during extrusion increases the viscosity of the PTFE having a high molecular weight. Therefore, it may be difficult to extrude a tube with a small diameter, or an inefficient extrusion using a cylinder with a small diameter may be necessary in order to suppress the reduction ratio, which is a ratio of the area of a filling opening to the area of a discharge opening of an extruder, which may result in difficulty of industrial mass production.

On the other hand, when a PTFE having a low molecular weight is used, fibrillation during extrusion with a small diameter can be suppressed. However, the bubble point may decrease or breakage may occur during the expansion step, and it may become difficult to make the resulting hollow-fiber membrane porous.

The present disclosure has been made on the basis of the circumstances described above. An object of the present disclosure is to provide a hollow-fiber membrane having a high porosity and a high bubble point while having a reduced hole diameter, and a hollow-fiber membrane module that is particularly excellent in terms of degassing performance.

Advantageous Effects of Present Disclosure

A hollow-fiber membrane according to an aspect of the present disclosure can have both an enhanced porosity and an enhanced bubble point while having a reduced hole diameter. A hollow-fiber membrane module according another aspect of the present disclosure is particularly excellent in terms of degassing performance.

Description of Embodiments of Present Disclosure

First, aspects of the present disclosure will be listed and described.

A hollow-fiber membrane according to an aspect of the present disclosure contains a polytetrafluoroethylene or a modified polytetrafluoroethylene as a main component, in which the hollow-fiber membrane has an average outer diameter of 1 mm or less and an average inner diameter of 0.5 mm or less, and in a measurement of a heat of fusion of the polytetrafluoroethylene or the modified polytetrafluoroethylene with a differential scanning calorimeter, when the polytetrafluoroethylene or the modified polytetrafluoroethylene is subjected to a first step of heating from room temperature to 245° C. at a rate of 50° C./min and subsequently heating from 245° C. to 365° C. at a rate of 10° C./min, a second step of cooling from 365° C. to 350° C. at a rate of −10° C./min, maintaining the temperature, subsequently cooling from 350° C. to 330° C. at a rate of −10° C./min, and further cooling from 330° C. to 305° C. at a rate of −1° C./min, and a third step of cooling from 305° C. to 245° C. at a rate of −50° C./min and subsequently heating from 245° C. to 365° C. at a rate of 10° C./min, a heat of fusion from 296° C. to 343° C. in the third step is 30.0 J/g or more and 45.0 J/g or less.

The hollow-fiber membrane is produced by expanding a nonporous tubular formed body that is obtained by first performing molding to obtain a tubular formed body and then sintering the tubular formed body by heating to a temperature equal to or higher than 343° C., which is a melting point of the PTFE. Usually, a sintered nonporous tubular formed body may be broken by expansion, or even if expansion is performed, such a sintered nonporous tubular formed body only shrinks in the radial direction and does not become porous.

The hollow-fiber membrane can be obtained by forming, into a nonporous tubular formed body, a low-molecular weight PTFE or modified PTFE in which when the low-molecular weight PTFE or modified PTFE is subjected to the first step to the third step in advance, a heat of fusion from 296° C. to 343° C. in the third step is 30.0 J/g or more and 45.0 J/g or less. Alternatively, a nonporous tubular formed body may be obtained by using a high-molecular weight PTFE or modified PTFE in which a heat of fusion from 296° C. to 343° C. in the third step is 30.0 J/g or less, and the nonporous tubular formed body may then be irradiated with ionizing radiation. Thus, in the PTFE or modified PTFE, which serves as a main component of the hollow-fiber membrane, the heat of fusion from 296° C. to 343° C. in the third step can be adjusted to 30.0 J/g or more and 45.0 J/g or less.

Such a nonporous tubular formed body has high deformability and can be expanded beyond a typical yield point that firstly appears on the load-elongation curve to a next inflection point that appears before breaking occurs. As a result, a porous hollow-fiber membrane having a fine hole diameter can be obtained. The porous structure of an existing expanded PTFE is a structure in which a fiber bundle aggregate formed by a shear force during paste extrusion is expanded to a spider web shape (web shape) by expansion. In contrast, the porous structure of the hollow-fiber membrane is formed by cleavage of ultrafine crystal grain boundaries in the nonporous formed body. When the hollow-fiber membrane is subjected to the first step to the third step, the heat of fusion from 296° C. to 343° C. in the third step is within the optimum range of 30.0 J/g or more and 45.0 J/g or less. Therefore, it is considered that the hollow-fiber membrane contains a thermally stable crystalline component in a large amount, and that cleavage points (crystal grain boundaries) are present in the hollow-fiber membrane at an optimum density. As a result, the hollow-fiber membrane can have characteristics of being porous and having an average outer diameter of 1 mm or less, an average inner diameter of 0.5 mm or less, a high porosity, and a high bubble point, which have not been achieved in the related art.

Herein, the "main component" refers to a component that has the highest content on a mass basis and refers to a component that has a content of, for example, 50% by mass or more, preferably 70% by mass or more, and more preferably 95% by mass or more. The "average outer diameter" refers to an average value of the outer diameter at two random points. The "average inner diameter" refers to an average value of the inner diameter at two random points.

The hollow-fiber membrane preferably has a porosity of 30% or more and an isopropanol bubble point of 500 kPa or more. When the porosity and isopropanol bubble point of the hollow-fiber membrane are within the above ranges, the hollow-fiber membrane can have further enhanced degassing capability.

Herein, the "porosity" refers to a ratio of the total volume of pores to the volume and can be determined by measuring the density in accordance with ASTM-D-792. The "isopropanol bubble point" refers to a value measures by using isopropyl alcohol in accordance with ASTM-F316-86, represents the minimum pressure necessary for pushing a liquid out from pores, and is an index corresponding to a mean pore diameter.

A hollow-fiber membrane module according to another aspect of the present disclosure is a hollow-fiber membrane module capable of removing a gas dissolved in a liquid, the hollow-fiber membrane module including a casing and a plurality of hollow-fiber membranes aligned in one direction, the hollow-fiber membranes each being the above-described hollow-fiber membrane, in which a packing ratio of the hollow-fiber membranes to the casing is 15% or more and 80% or less.

Herein, the "packing ratio of the hollow-fiber membranes" refers to a packing density of hollow-fiber membranes packed in a casing and is a ratio (%) of the sum of the cross-sectional areas occupied by hollow-fiber membranes in a cross section perpendicular to a length direction of the hollow-fiber membranes and formed by inner surfaces of the casing, the cross-sectional areas being determined from the outer diameters of the hollow-fiber membranes, to the area of the cross section (refers to a packing ratio based on the outer diameters of the hollow-fiber membranes).

Since the packing ratio of the hollow-fiber membranes having a high porosity and a high bubble point is 15% or more and 80% or less, the hollow-fiber membrane module is particularly excellent in terms of degassing performance.

In the hollow-fiber membrane module, when pure water having a dissolved oxygen concentration of 6.5 ppm or more is passed to remove oxygen, a relation between a ratio $x_1$ of an amount of the pure water supplied per minute to a product of a volume of the casing and the packing ratio and a degassing rate $y_1$ preferably satisfies formula (1) below:

$$y_1 \geq -0.093 x_1 + 0.84 \quad (1)$$

(where, in formula (1), $0.59 \leq x_1 \leq 5.41$).

When the capability of removing oxygen dissolved in pure water is within the above range, the hollow-fiber membrane module exhibits a better degassing effect for a liquid.

In the hollow-fiber membrane module, when pure water having a dissolved oxygen concentration of 6.5 ppm or more is passed to remove oxygen, a relation between a ratio $x_1$ of an amount of the pure water supplied per minute to a product of a volume of the casing and the packing ratio and a dissolved oxygen concentration $y_2$ preferably satisfies formula (2) below:

$$y_2 \leq 0.64 x_1 + 1.10 \quad (2)$$

(where, in formula (2), $0.59 \leq x_1 \leq 5.41$).

When the capability of removing oxygen dissolved in pure water is within the above range, the hollow-fiber membrane module exhibits a better degassing effect for a liquid.

In the hollow-fiber membrane module, the packing ratio of the hollow-fiber membranes to the casing is preferably 30% or more and 80% or less, and when pure water having a dissolved oxygen concentration of 6.5 ppm or more is passed to remove oxygen, a relation between a ratio $x_2$ of an amount of the pure water supplied per minute to a volume of the casing and a degassing rate $y_1$ preferably satisfies formula (3) below:

$$y_1 \geq -0.23 x_2 + 0.88 \quad (3)$$

(where, in formula (3), $0.62 \leq x_2 \leq 2.10$).

When the capability of removing oxygen dissolved in pure water is within the above range, the hollow-fiber membrane module exhibits a better degassing effect for a liquid.

In the hollow-fiber membrane module, the packing ratio of the hollow-fiber membranes to the casing is preferably 30% or more and 80% or less, and when pure water having a dissolved oxygen concentration of 6.5 ppm or more is passed to remove oxygen, a relation between a ratio $x_2$ of an amount of the pure water supplied per minute to a volume of the casing and a dissolved oxygen concentration $y_2$ preferably satisfies formula (4) below:

$$y_2 \leq 1.48 x_2 + 0.85 \quad (4)$$

(where, in formula (4), $0.62 \leq x_2 \leq 2.10$).

When the capability of removing oxygen dissolved in pure water is within the above range, the hollow-fiber membrane module exhibits a better degassing effect for a liquid.

Herein, the "degassing rate" refers to a ratio (%) of the difference between an initial dissolved oxygen concentration of pure water and a dissolved oxygen concentration of pure water after degassing to the initial dissolved oxygen concentration of pure water. That is, the degassing rate (%) is represented by the following formula.

Degassing rate (%)=(initial dissolved oxygen concentration−dissolved oxygen concentration after degassing)/(initial dissolved oxygen initial concentration)

Details of Embodiments of Present Disclosure

A hollow-fiber membrane and a hollow-fiber membrane module according to embodiments of the present disclosure will be described in detail below with reference to the drawings.

<Hollow-Fiber Membrane>

Figure 2:
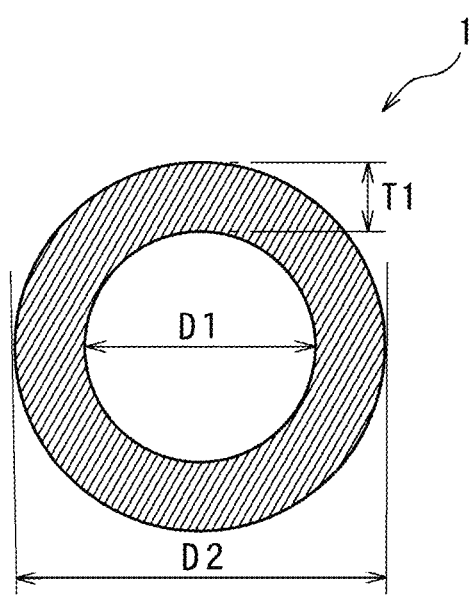
FIG. 2 is a sectional view of the hollow-fiber membrane taken along line A-A in FIG. 1.

A hollow-fiber membrane 1 in FIGS. 1 and 2 contains a polytetrafluoroethylene (PTFE) or a modified polytetrafluoroethylene (modified PTFE) as a main component and has an average outer diameter of 1 mm or less and an average inner diameter of 0.5 mm or less.

The modified PTFE refers to a PTFE obtained by copolymerization of a tetrafluoroethylene and a small amount of, for example, hexafluoropropylene (HFP), an alkyl vinyl ether (AVE), or chlorotrifluoroethylene (CTFE), preferably in an amount of 1/50 (molar ratio) or less relative to the tetrafluoroethylene.

With regard to the hollow-fiber membrane 1, in a measurement of a heat of fusion of the polytetrafluoroethylene or the modified polytetrafluoroethylene with a differential scanning calorimeter, when the polytetrafluoroethylene or the modified polytetrafluoroethylene is subjected to a first step of heating from room temperature to 245° C. at a rate of 50° C./min and subsequently heating from 245° C. to 365° C. at a rate of 10° C./min; a second step of cooling from 365° C. to 350° C. at a rate of −10° C./min, maintaining the temperature, subsequently cooling from 350° C. to 330° C. at a rate of −10° C./min, and further cooling from 330° C. to 305° C. at a rate of −1° C./min; and a third step of cooling from 305° C. to 245° C. at a rate of −50° C./min and subsequently heating from 245° C. to 365° C. at a rate of 10° C./min, a heat of fusion from 296° C. to 343° C. in the third step is 30.0 J/g or more and 45.0 J/g or less. The amount of a sample in the above measurement is 10 mg to 20 mg, and the sampling time is 0.5 sec/time. Since the heat of fusion from 296° C. to 343° C. in the third step is 30.0 J/g or more and 45.0 J/g or less when the polytetrafluoroethylene or the modified polytetrafluoroethylene is subjected to the first step to the third step, the hollow-fiber membrane 1 can be provided with properties suitable for expansion. Accordingly, the hollow-fiber membrane 1 has high deformability and can be expanded beyond a typical yield point that firstly appears on the load-elongation curve to a next inflection point that appears before breaking occurs. As a result, a porous hollow-fiber membrane having a fine hole diameter can be obtained. Accordingly, the hollow-fiber membrane 1 has characteristics of being porous and having as an average outer diameter of 1 mm or less, an average inner diameter of 0.5 mm or less, a high porosity, and a high bubble point, which have not been achieved in the related art.

The above heat of fusion is an amount of heat absorbed from 296° C. to 343° C. in the third step.

The heating, the cooling, the measurement of the amount of heat absorption, and the like are conducted by using a differential scanning calorimeter. In the measurement with a differential scanning calorimeter, the amount of a sample is typically about 10 mg to 20 mg.

In the hollow-fiber membrane 1, the lower limit of the heat of fusion from 296° C. to 343° C. in the third step is 30.0 J/g and preferably 33 J/g. On the other hand, the upper limit of the heat of fusion is 45.0 J/g and preferably 42 J/g. If the heat of fusion is less than the lower limit, a good porosity may not be obtained. Conversely, if the heat of fusion exceeds the upper limit, the hollow-fiber membrane 1 has a low strength and may be broken during expansion.

In PTFEs for molding, the PTFEs having been generally used, the heat of fusion in the third step is less than 30 J/g when the PTFEs are subjected to the first step to the third step. Accordingly, a hollow-fiber membrane composed of this resin is also considered to have a heat of fusion of less than 30 J/g. It is considered that such a resin is used as a result of consideration of formability of mold forming, paste extrusion molding, or the like and the strength of the formed articles. For example, in paste extrusion, a resin with 20 J/g or less or about 25 J/g is used depending on, for example, molding dimensions in order to make the quality such as molding dimensions or the mechanical strength to uniform. The hollow-fiber membrane differs from existing hollow-fiber membranes in that the range of the heat of fusion from 296° C. to 343° C. in the third step is 30.0 J/g or more and 45.0 J/g or less. Due to this difference, the hollow-fiber membrane has higher deformability and significantly better shock absorbency and deformation adhesiveness than existing hollow-fiber membranes. Furthermore, a porous hollow-fiber membrane having a fine hole diameter and a high porosity can be obtained through an expansion step.

The above method for measuring a heat of fusion is applicable to the adjustment of the molecular weight of a PTFE or a modified PTFE serving as a main component and is very useful for production management. The molecular weights of PTFEs cannot be measured by a melt viscosity method, a light scattering method, or an osmotic pressure method because PTFEs have a high melting temperature and a high viscosity and do not dissolve in solvents. Therefore, in general, the molecular weight of a PTFE or a modified PTFE is estimated from a specific gravity (ASTM D1457-56T) or a strength of a formed article. However, the molecular weight determined by any of these methods varies significantly, and it is substantially impossible to relatively compare the molecular weights of products after molding, the products having different shapes, dimensions, and structures. However, when a PTFE or a modified PTFE is once fused and then slowly cooled at a constant rate to recrystallize the resin, crystallization is unlikely to proceed as the molecular weight increases, and thus the heat of fusion when the resin is fused next time decreases, and conversely, as the molecular weight decreases, the heat of fusion increases. Accordingly, the molecular weight of the PTFE or the modified PTFE can be estimated from the measurement value of the heat of fusion. The inventors of the present invention found that the heat of fusion after an application of a certain thermal history is very useful to estimate the molecular weight and can be used for production management. It should be noted that the molecular weight can also be estimated from the amount of heat generated during slow cooling in the above method instead of the heat of fusion, and the amount of heat generation can also be used for production management.

The hollow-fiber membrane 1 may contain, in addition to the PTFE, other fluororesins and additives within a range that does not impair the desired advantages of the present disclosure. Examples of the additives include pigments for coloring and inorganic fillers, metal powders, metal oxide powders, and metal sulfide powders for improving wear resistance, preventing cold flow, or facilitating formation of pores.

The lower limit of an average outer diameter D2 of the hollow-fiber membrane 1 is not particularly limited but is preferably 0.1 mm, and more preferably 0.2 mm. On the other hand, the upper limit of the average outer diameter D2 of the hollow-fiber membrane is 1.0 mm, and preferably 0.75 mm. If the average outer diameter D2 is less than the lower limit, the pressure loss may increase. Conversely, if the average outer diameter D2 exceeds the upper limit, the area of membranes that are housed in the casing of the module may decrease or pressure-resistance strength decreases, which may result in rupture due to the internal pressure or buckling due to the external pressure.

The lower limit of an average inner diameter D1 of the hollow-fiber membrane is not particularly limited but is preferably 0.05 mm, and more preferably 0.1 mm. On the other hand, the upper limit of the average inner diameter D1 of the hollow-fiber membrane is 0.5 mm, and preferably 0.3 mm. If the average inner diameter D1 is less than the lower limit, the pressure loss may increase. Conversely, if the average inner diameter D1 exceeds the upper limit, pressure-resistance strength decreases, which may result in rupture due to the internal pressure or buckling due to the external pressure.

The lower limit of an average thickness T1 of the hollow-fiber membrane is preferably 0.025 mm, and more preferably 0.05 mm. On the other hand, the upper limit of the average thickness T1 of the hollow-fiber membrane is 0.5 mm, and preferably 0.3 mm. If the average thickness T1 is less than the lower limit, pressure-resistance strength decreases, which may result in rupture due to the internal pressure or buckling due to the external pressure. Conversely, if the average thickness T1 exceeds the upper limit, gas permeability may decrease. Herein, the "average thickness" refers to an average value of the thickness at 10 random points.

The lower limit of the porosity of the hollow-fiber membrane is preferably 30%, and more preferably 40%. On the other hand, the upper limit of the porosity of the hollow-fiber membrane 1 is not particularly limited but is preferably 80%, and more preferably 70%. If the porosity is less than the lower limit, the separation performance may become insufficient. Conversely, if the porosity exceeds the upper limit, the hollow-fiber membrane may have an insufficient mechanical strength.

The lower limit of the isopropanol bubble point of the hollow-fiber membrane is preferably 500 kPa, and more preferably 1,000 kPa. On the other hand, the upper limit of the isopropanol bubble point of the hollow-fiber membrane is preferably 3,000 kPa, and more preferably 2,500 kPa. If the isopropanol bubble point of the hollow-fiber membrane is less than the lower limit, the hollow-fiber membrane may have an insufficient liquid-holding capacity. If the isopropanol bubble point of the hollow-fiber membrane exceeds the upper limit, gas permeability may decrease, and the degassing efficiency of the hollow-fiber membrane may decrease.

Since the hollow-fiber membrane has a high porosity and a high bubble point while having a reduced hole diameter, the hollow-fiber membrane can be suitably used as a hollow-fiber membrane of, in addition to various filtration apparatuses, degassing apparatuses that are particularly used in, for example, semiconductor manufacturing processes, printers, liquid crystal enclosure processes, chemical liquid manufacturing processes, hydraulic machines, samples for analysis devices, artificial blood vessels, and artificial heart-lungs.

[Method for Producing Hollow-Fiber Membrane]

Next, an example of a method for producing the hollow-fiber membrane will be described. The method for producing the hollow-fiber membrane preferably includes, for example, a forming step of forming particles of a PTFE or a modified PTFE into a tubular shape, a sintering step of heating the tubular formed article to a temperature equal to or higher than the melting point of the PTFE or modified PTFE, a step of cooling the melted resin, and an expansion step of expanding the nonporous tubular formed article to make the nonporous tubular formed article porous. Since the hollow-fiber membrane is formed by performing expansion after forming, a porous hollow-fiber membrane can be formed while the hole diameter of the hollow-fiber membrane is reduced.

The hollow-fiber membrane is obtained by, for example, once melting a PTFE or modified PTFE having a heat of fusion from 296° C. to 343° C. in the third step of 30.0 J/g or more and 45.0 J/g or less to eliminate gaps between particles, and then slowly cooling the PTFE or modified PTFE. That is, the method includes a step of heating the PTFE or modified PTFE to a temperature equal to or higher than the melting point thereof to melt the PTFE or modified PTFE, a step of cooling the melted resin, and/or a step of maintaining the PTFE or modified PTFE at 313° C. or higher and lower than 321° C. for 10 minutes or more.

When a PTFE or modified PTFE having a heat of fusion of 30.0 J/g or more and 45.0 J/g or less is used, such a PTFE or modified PTFE can be obtained by, for example, a method including irradiating a PTFE having a heat of fusion of less than 30.0 J/g with ionizing radiation such as gamma-rays, X-rays, ultraviolet rays, or an electron beam, or a method using, for example, a decomposition reaction by heating.

(Forming Step)

In the forming step, a PTFE or modified PTFE powder produced by, for example, emulsion polymerization is formed into a tubular shape to obtain a tubular formed article. PTFE or modified PTFE particles serving as a raw material are a powder composed of fine particles of a PTFE or modified PTFE. A PTFE or modified PTFE dispersion that is an emulsion in which fine particles of a PTFE or modified PTFE (PTFE or modified PTFE powder) are dispersed in a liquid (dispersion medium) can also be used as the PTFE or modified PTFE powder serving as the raw material. Examples of the PTFE or modified PTFE powder include PTFE or modified PTFE fine powders that are powders composed of fine particles of a PTFE or modified PTFE and that are produced by emulsion polymerization, and PTFE or modified PTFE molding powders produced by suspension polymerization.

In the case where a modified PTFE powder is formed into a tubular shape to obtain a tubular formed article having a predetermined shape and predetermined dimensions, a publicly known method for forming a membrane from a powder is employed. Examples of the method include a method including blending an extrusion aid with a raw material powder and performing mixing, and subsequently forming the mixture into a tubular shape by paste extrusion, and a method (casting method) including performing forming by using a modified PTFE dispersion or the like and removing a dispersion medium by drying. The methods described above are generally employed because a modified PTFE usually has a high melt viscosity and it is difficult to perform melt extrusion or it is also difficult to prepare a solution of the modified PTFE.

(Sintering Step)

In the sintering step, the tubular formed article is heated to a temperature equal to or higher than the melting point of the PTFE or modified PTFE to obtain a nonporous tubular formed article. A hollow-fiber membrane obtained by pressing PTFE particles or modified PTFE particles that are produced by, for example, emulsion polymerization into a shape has pores and voids due to gaps between the particles and omission of the aid. However, when the PTFE or modified PTFE powder is completely melted, these pores and voids disappear or the sizes of substantially continuous voids are minimized. As a result, a nonporous tubular formed article is produced. A nonporous membrane-like formed article means a membrane having substantially no pores that penetrate the membrane. Specifically, a membrane having Gurley seconds of 5,000 seconds or more is preferred. In order to completely melt the modified PTFE powder and to produce a nonporous membrane-like formed article having large Gurley seconds, the formed article is preferably heated at a temperature higher than the melting point of the raw material. In addition, in order to suppress decomposition and denaturation of the resin, the heating temperature is preferably a temperature of 450° C. or lower.

(Cooling Step)

After the sintering step, a step of cooling the PTFE or modified PTFE by slow cooling is preferably performed. The cooling step may be performed by a method in which the temperature is increased to a temperature equal to or higher than the melting point of the PTFE or modified PTFE and then gradually decreased to a temperature equal to or lower than the crystalline melting point to perform slow cooling, or a method in which heating is performed at a temperature slightly lower than the melting point of the PTFE or modified PTFE for a certain period of time (hereinafter, may be referred to as a "constant-temperature treatment"). This cooling generates crystals in the PTFE or modified PTFE and can saturate the degree of crystallinity of the resin of the PTFE or modified PTFE before the subsequent expansion step. Therefore, reproducibility of the pore diameter can be further enhanced in the production of a porous membrane. In the crystallization process, as the cooling rate decreases or as the constant-temperature treatment time increases, the degree of crystallinity tends to be high and the heat of fusion tends to be high. On the other hand, as the cooling rate increases or as the constant-temperature treatment time decreases, the degree of crystallinity tends to be low and the heat of fusion tends to be low.

The heat of fusion of the hollow-fiber membrane depends on the amount of the crystals generated, and the amount of the crystals generated is affected by the cooling rate. Accordingly, in order to obtain the heat of fusion in the above range, the cooling is performed by slow cooling (gradual cooling) and/or by cooling that includes maintaining at 313° C. or higher and lower than 321° C. for 10 minutes or more. The slow cooling is preferably conducted at a cooling rate of −3.0° C./min or less, and the cooling is more preferably conducted at a rate of −2.0° C./min or less.

Even when the cooling rate is out of the above range, maintaining at 313° C. or higher and lower than 321° C. for 10 minutes or more enables crystallization to be accelerated. That is, although slow cooling requires a highly precise temperature control, the heat treatment method that includes maintaining at a constant temperature does not require a highly precise temperature control and enables heat treatment to be more stably and homogeneously performed. Furthermore, since slow cooling from a temperature equal to or higher than the melting point causes the PTFE or modified PTFE to be fused together, this slow cooling cannot be performed for a long product in a rolled state. Therefore, it is necessary to perform the sintering step and the cooling step over a long time while the product is drawn out at a very low linear velocity. In contrast, according to the above-described heat treatment method that includes maintaining at a constant temperature, after cooling to a temperature lower than the melting point, a roll of a long product is formed, and crystallization can be accelerated in the form of the roll. Therefore, mass production can be realized by a batch treatment of a large amount. The step of maintaining at 313° C. or higher and lower than 321° C. for 10 minutes or more may be conducted in the course of cooling after the sintering step. Alternatively, heating and maintaining in the above temperature range may be conducted after cooling.

As for the powder or granule of a PTFE or modified PTFE used as the raw material, a PTFE powder or granule whose heat of fusion has been adjusted to the above range may be used without further treatment (as a single product). Alternatively, a mixture of two or more types of PTFE powders or granules at least one of which has a heat of fusion within the above range may be used.

(Expansion Step)

In the expansion step, the nonporous tubular formed article obtained as described above is expanded to make the formed article porous. A porous hollow-fiber membrane can be obtained by expanding the nonporous tubular formed article. In the expansion step, expansion is preferably performed in the axial direction and the circumferential direction. The expansion ratio in the axial direction may be, for example, 3 times or more and 7 times or less, and the expansion ratio in the circumferential direction may be, for example, 2 times or more and 4 times or less. The size and the shape of pores of the hollow-fiber membrane can be adjusted by adjusting expansion conditions such as the expansion temperature and the expansion ratios.

The expansion is preferably performed beyond a typical yield point (hereinafter, also referred to as a "first yield point") that firstly appears on the load-elongation curve to a next inflection point (hereinafter, also referred to as a "second yield point") that appears before breaking occurs. As a result of studies, the inventors of the present invention found that a homogeneous expansion can be performed in the expansion up to this second yield point, and that this second yield point is a limiting point of the homogeneous expansion. The second yield point is considered to be a limit at which expansion can be performed. It is considered that the expansion up to this range enables the formation of fine pores with less variation in pore diameter. In the expansion up to the second yield point, fine pores generated by this expansion have small pore diameters, and the variation in pore diameter is also small in spite of a large expansion. It is considered that a high porosity is achieved in the hollow-fiber membrane because the expansion up to the second yield point is conducted in which the hollow-fiber membrane is greatly expanded while fine pores with less variation in pore diameter are formed. On the other hand, in the case of the expansion beyond the second yield point, the variation in pore diameter increases, and defects such as pinholes are often formed.

According to the method for producing the hollow-fiber membrane, it is possible to produce the hollow-fiber membrane having a high porosity and a high bubble point while having a reduced hole diameter.

<Hollow-Fiber Membrane Module>

A hollow-fiber membrane module according to another aspect of the present disclosure is a hollow-fiber membrane module for membrane separation and includes a casing and a plurality of hollow-fiber membranes aligned in one direction, the hollow-fiber membranes each being the hollow-fiber membrane described above. The hollow-fiber membrane module is used in applications to various membrane separations such as filtration and degassing. Accordingly, in the hollow-fiber membrane module, an object that is passed through the hollow-fiber membranes varies according to the applications such as filtration and degassing. For example, when the hollow-fiber membrane module is used as a filtration module, the hollow-fiber membranes are permeable to a solvent in a liquid to be treated, while preventing the permeation of impurities contained in the liquid to be treated and having a certain particle size or larger. When the hollow-fiber membrane module is used as a degassing module, the hollow-fiber membranes are permeable to either a liquid or a gas. The hollow-fiber membrane module is applicable to applications in any field.

For example, the hollow-fiber membrane module can be used in various applications such as filtration of river water or lake water, filtration of water for atomic power generation or thermal power generation, filtration of condensate, an application to water treatment such as sterilization of water or filtration collection of waste liquid, filtration of food, filtration or separation of organic solvents, degassing of liquids, and an enrichment function of a specific gas such as oxygen, carbon dioxide, nitrogen, or hydrogen achieved by selective permeation of the gas.

The hollow-fiber membrane module can be used in the form of a built-in type module in which the hollow-fiber membrane module is fixed in an inkjet printer, a degassing apparatus, a filtration apparatus, or the like or an exchangeable cartridge type module in which a casing and separation membranes are independent from each other and which is used by inserting the separation membranes into the casing.

Figure 3:
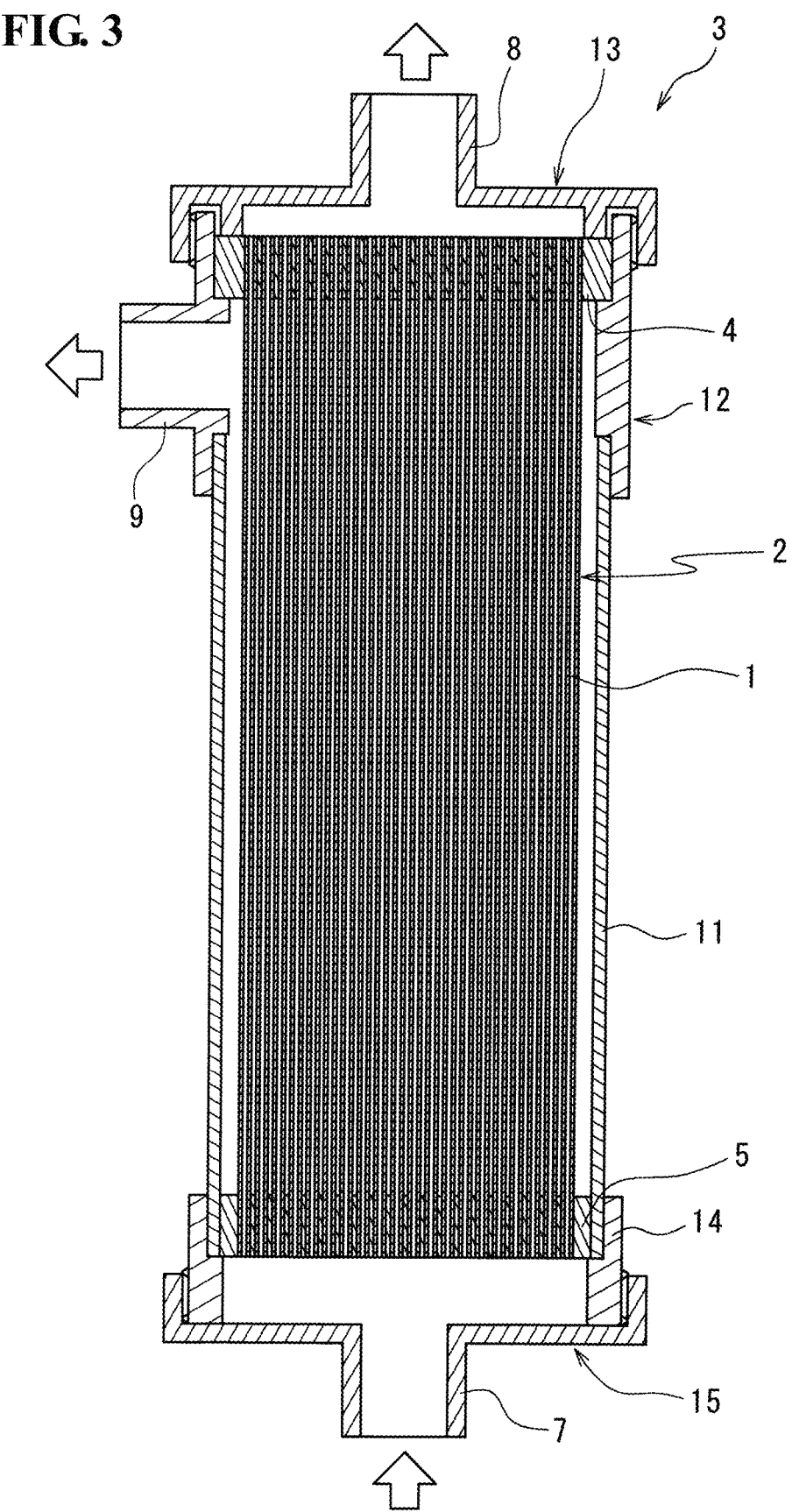
FIG. 3 is a schematic sectional view illustrating a hollow-fiber membrane module according to an embodiment of the present disclosure.
Figure 4:
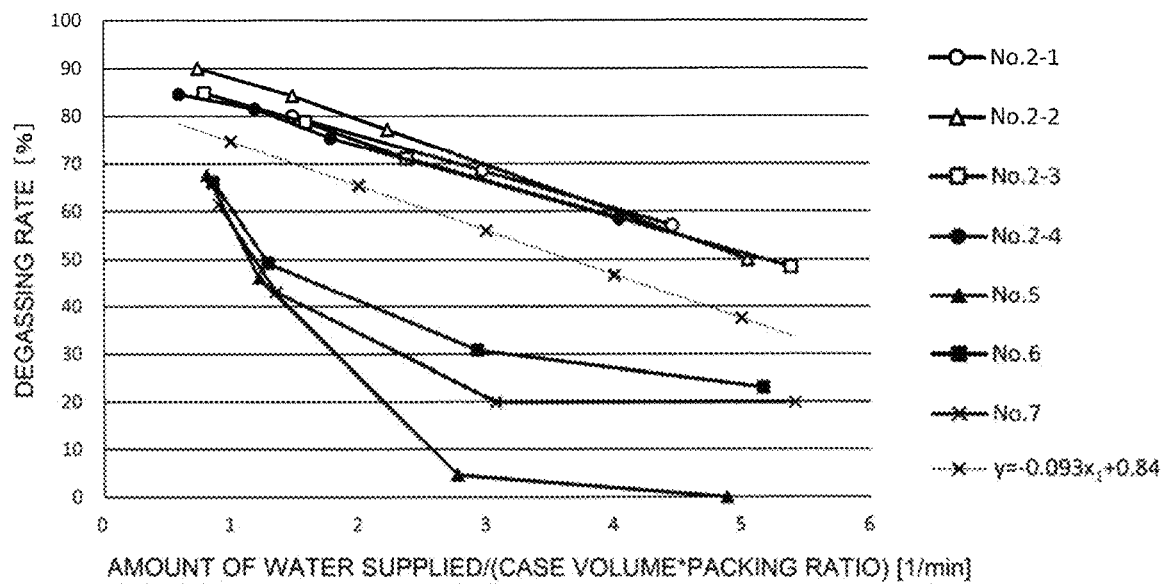
FIG. 4 is a graph showing the relationship between a degassing rate and a ratio of the amount of pure water supplied to the product of the volume of a casing and a packing ratio.
Figure 5:
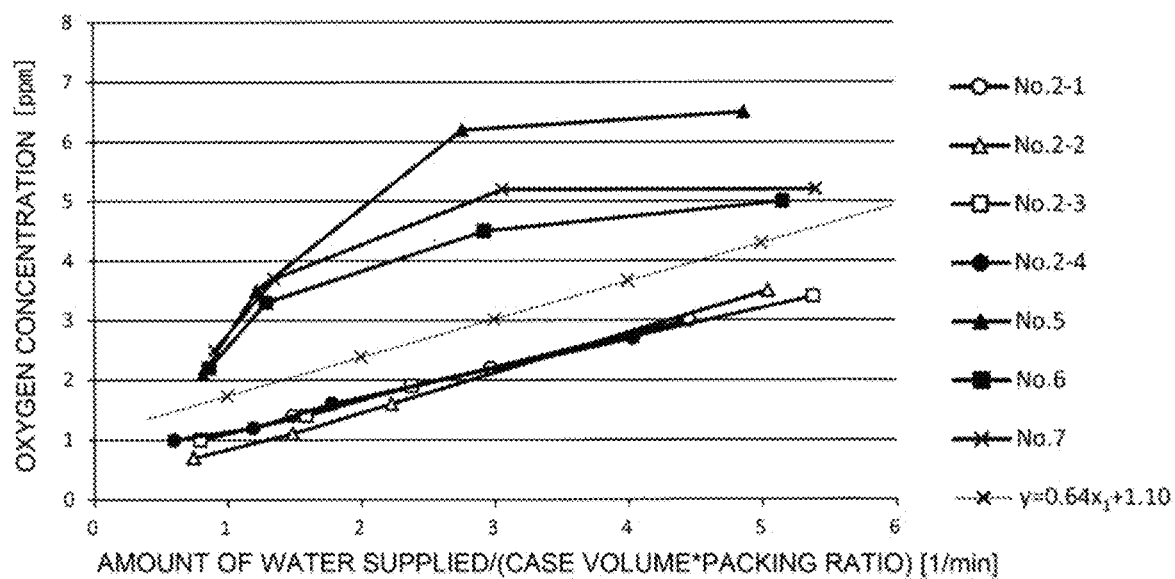
FIG. 5 is a graph showing the relationship between a dissolved oxygen concentration and a ratio of the amount of pure water supplied to the product of the volume of a casing and a packing ratio.
Figure 6:
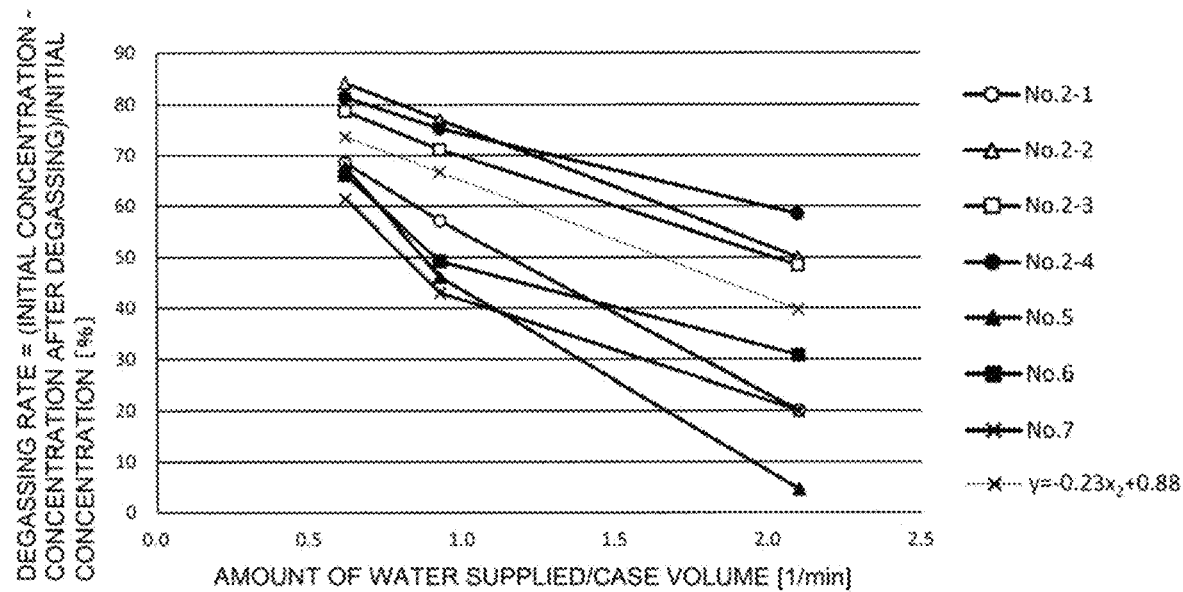
FIG. 6 is a graph showing the relationship between a degassing rate and a ratio of the amount of pure water supplied to the volume of a casing.
Figure 7:
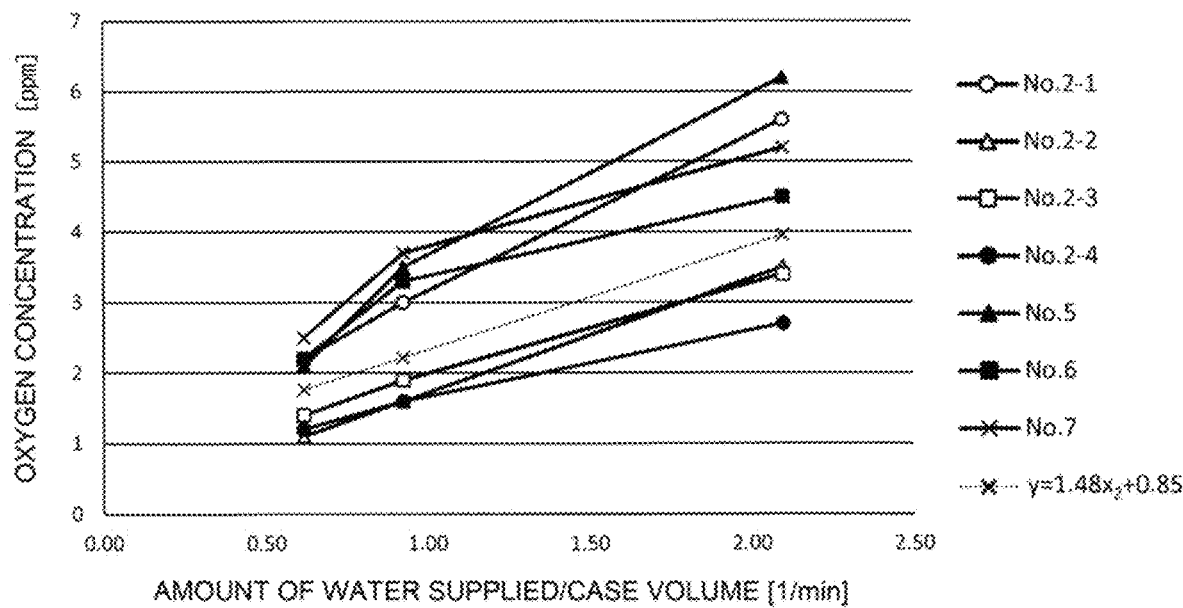
FIG. 7 is a graph showing the relationship between a dissolved oxygen concentration and a ratio of the amount of pure water supplied to the volume of a casing.

FIG. 3 illustrates a hollow-fiber membrane module 3 for degassing as an example of a hollow-fiber membrane module according to an embodiment of the present disclosure. The hollow-fiber membrane module 3 includes a membrane member 2 having a plurality of hollow-fiber membranes aligned in one direction, the hollow-fiber membranes each being the hollow-fiber membrane 1 described above, and a tubular casing 11 that houses the membrane member 2 having the plurality of hollow-fiber membranes 1. The hollow-fiber membrane module 3 is a type of module in which a liquid is passed through the hollow-fiber membranes to remove a gas dissolved in the liquid.

The membrane member 2 has a first sealing portion 4 that holds one end portion of each of the plurality of hollow-fiber membranes 1 and a second sealing portion 5 that holds the other end portion of each of the plurality of hollow-fiber membranes 1.

The hollow-fiber membrane module 3 may be configured to have the tubular casing 11, a first sleeve 12 mounted on an end portion on one side of the casing 11 and having an engagement structure in which a gas nozzle 9 and the first sealing portion 4 engage each other, a first cap 13 sealing an end portion of the sleeve 12 on the opposite side of the casing 11 and provided with a liquid discharge opening 8, a second sleeve 14 mounted on an end portion on the other side of the casing 11, and a second cap 15 sealing an end portion of the second sleeve 14 on the opposite side of the casing 11 and provided with a liquid supply opening 7.

The hollow-fiber membrane module 3 has, on an end face of one end portion, the liquid supply opening 7 through which a liquid to be treated is supplied, and, on another end face of the other end portion, the liquid discharge opening 8 through which the liquid that has passed through the plurality of hollow-fiber membranes 1 is discharged. The gas nozzle 9 is provided on the side face of the casing 11. The liquid to be treated, the liquid being supplied from the liquid supply opening 7 into the second cap 15, passes through the hollow-fiber membranes 1 and is supplied into the casing 11. The liquid that has passed through the hollow-fiber membranes 1 is then discharged from the liquid discharge opening 8 provided on the side face of the casing 11 near the other end portion. In addition, the air is suctioned by a vacuum pump (not shown) from the gas nozzle 9 to thereby reduce the pressure on the outside of the hollow-fiber membranes 1. A gas dissolved in the liquid that passes through the hollow-fiber membranes 1 is suctioned from the wall surfaces of the hollow-fiber membranes 1 toward the gas nozzle 9 and is discharged from the leading end of the gas nozzle 9.

Examples of the material of structural elements of the hollow-fiber membrane module 3 include metals such as iron, stainless steel, and aluminum; and resin compositions that contain, as a main component, a PTFE, polyvinyl chloride, polyethylene, an ABS resin, or the like. The structural elements may each be composed of different materials.

The lower limit of the packing ratio of the hollow-fiber membranes in the hollow-fiber membrane module is 10%, preferably 15%, and more preferably 30%. On the other hand, the upper limit of the packing ratio of the hollow-fiber membranes is 80%, preferably 75%, and more preferably 70%. If the packing ratio of the hollow-fiber membranes is less than the lower limit, the degassing performance of the hollow-fiber membrane module 3 may decrease. Conversely, if the packing ratio of the hollow-fiber membranes exceeds the upper limit, the hollow-fiber membranes may be crushed when the hollow-fiber membranes are packed in a container or difficulties may be caused in the case of packing the hollow-fiber membranes in the casing. When the packing ratio of the hollow-fiber membranes having a high porosity and a high bubble point is 15% or more and 80% or less, the hollow-fiber membrane module has good degassing performance.

In the hollow-fiber membrane module, when pure water having a dissolved oxygen concentration of 6.5 ppm or more is passed to remove oxygen, a relation between a ratio $x_1$ of an amount of the pure water supplied per minute to a product of a volume of the casing and the packing ratio and a degassing rate $y_1$ preferably satisfies formula (1) below:

$$y_1 \geq -0.093 x_1 + 0.84 \quad (1)$$

(where, in formula (1), $0.59 \leq x_1 \leq 5.41$).

When the capability of removing oxygen dissolved in pure water is in the above range, the hollow-fiber membrane module has a further enhanced degassing effect for a liquid.

In the hollow-fiber membrane module, when pure water having a dissolved oxygen concentration of 6.5 ppm or more is passed to remove oxygen, a relation between a ratio $x_1$ of an amount of the pure water supplied per minute to a product of a volume of the casing and the packing ratio and a dissolved oxygen concentration $y_2$ preferably satisfies formula (2) below:

$$y_2 \leq 0.64 x_1 + 1.10 \quad (2)$$

(where, in formula (2), $0.59 \leq x_1 \leq 5.41$).

When the capability of removing oxygen dissolved in pure water is in the above range, the hollow-fiber membrane module has a further enhanced degassing effect for a liquid.

In the hollow-fiber membrane module, when the packing ratio of the hollow-fiber membranes to the casing is 30% or more and 80% or less, and pure water having a dissolved oxygen concentration of 6.5 ppm or more is passed to remove oxygen, a relation between a ratio $x_2$ of an amount of the pure water supplied per minute to a volume of the casing and a degassing rate $y_1$ preferably satisfies formula (3) below:

$$y_1 \geq -0.23 x_2 + 0.88 \quad (3)$$

(where, in formula (3), $0.62 \leq x_2 \leq 2.10$).

When the capability of removing oxygen dissolved in pure water is in the above range, the hollow-fiber membrane module has a further enhanced degassing effect for a liquid.

In the hollow-fiber membrane module, when the packing ratio of the hollow-fiber membranes to the casing is 30% or more and 80% or less, and pure water having a dissolved oxygen concentration of 6.5 ppm or more is passed to remove oxygen, a relation between a ratio $x_2$ of an amount of the pure water supplied per minute to a volume of the casing and a dissolved oxygen concentration $y_2$ preferably satisfies formula (4) below:

$$y_2 \leq 1.48 x_2 + 0.85 \quad (4)$$

(where, in formula (4), $0.62 \leq x_2 \leq 2.10$).

When the capability of removing oxygen dissolved in pure water is in the above range, the hollow-fiber membrane module has a further enhanced degassing effect for a liquid.

Since the hollow-fiber membrane module includes the hollow-fiber membranes having a high porosity and a high bubble point while having a reduced hole diameter, the hollow-fiber membrane module is particularly excellent in terms of degassing performance.

Other Embodiments

It is to be understood that the embodiments disclosed herein are only illustrative and non-restrictive in all respects. The scope of the present invention is not limited to the configurations of the embodiments but is defined by the appended claims. The scope of the present invention is intended to cover all changes within the meaning and scope equivalent to those of the claims.

In the above embodiments, the hollow-fiber membrane module is a liquid permeation-type hollow-fiber membrane module in which a liquid is passed through hollow-fiber membranes to remove a gas dissolved in the liquid. Alternatively, the hollow-fiber membrane module may be a gas permeation-type hollow-fiber membrane module in which a gas is passed through hollow-fiber membranes to remove the gas dissolved in a liquid. Even when the hollow-fiber membrane module is such a gas permeation-type hollow-fiber membrane module, the gas permeation-type hollow-fiber membrane module has substantially the same degassing performance as the liquid permeation-type hollow-fiber membrane module.

Examples

The present invention will be more specifically described below on the basis of Examples. However, the present invention is not limited to the Examples.

[Measurement of Physical Property Values]

First, a description will be made of methods for measuring physical property values, the methods being performed in Examples and Comparative Examples below.

(Measurement of Heat of Fusion)

A sample is weighed in an amount of 10 mg to 20 mg, and the PTFE is sealed in an aluminum cell as needed. Here, it is important that the PTFE be maintained in a free state so that the PTFE can be contracted and deformed as much as possible, and therefore, the cell is not crushed or not completely crushed.

This sample is heated and cooled under the following conditions.

The sample is heated from room temperature to 245° C. at a rate of 50° C./min and subsequently heated from 245° C. to 365° C. at a rate of 10° C./min (first step).

Next, the sample is cooled from 365° C. to 350° C. at a rate of −10° C./min, maintained at the temperature, subsequently cooled from 350° C. to 330° C. at a rate of −10° C./min, and further cooled from 330° C. to 305° C. at a rate of −1° C./min (second step).

Next, the sample is cooled from 305° C. to 245° C. at a rate of −50° C./min and subsequently heated from 245° C. to 365° C. at a rate of 10° C./min (third step).

The sampling time was set to 0.5 sec/time, and the amount of heat absorption and the amount of heat generation were determined by using a heat-flux differential scanning calorimeter DSC-60A manufactured by Shimadzu Corporation. The amount of heat absorption in the first step is a value determined by integrating a section from 303° C. to 353° C. The amount of heat generation in the second step is a value determined by integrating a section from 318° C. to 309° C. The amount of heat absorption in the third step is a value determined by integrating a section from 296° C. to 343° C. This amount of heat absorption in the third step is defined as the heat of fusion.

(Porosity)

A dry mass of the sample and a mass of the sample in water were measured, and the volume of the sample was determined from the difference between these masses. In addition, the volume of the resin constituting the sample was calculated from the dry mass on the assumption that the true density of PTFE is 2.17 g/cc. A ratio of the void volume determined by subtracting the volume of the resin from the volume of the sample to the volume of the sample was expressed in percentage and defined as a porosity.

(Isopropanol Bubble Point)

A hollow-fiber membrane was immersed in and impregnated with isopropyl alcohol in a container such that the inside of pores in the tube wall was filled with isopropyl alcohol, and subsequently, an air pressure (internal pressure) was gradually loaded from the inside of one end face in the immersion state. In this case, a pressure at which an air bubble comes out from the opposite surface for the first time was defined as a bubble point. The measurement maximum pressure at that time was 500 kPa.

<Hollow-Fiber Membrane, Test Example No. 1 to No. 4 (Examples)>

[Preparation of Raw Material Powder]

PTFE fine powders below, which were raw material powders, were used as raw materials. The PTFE fine powders used here are each a powder obtained by drying a powder (emulsion polymerization product) composed of PTFE particles (primary particles) having a particle size of 0.15 μm to 0.35 μm produced by emulsion polymerization of tetrafluoroethylene, and granulating the powder to have a size of several hundreds of micrometers to several thousands of micrometers.

The raw material resins used in Test Example No. 1 to Test Example No. 4 are as follows.

Test Example No. 1 (F208 manufactured by Daikin Industries, Ltd.: modified PTFE)

Test Example No. 2 (F208 manufactured by Daikin Industries, Ltd.: modified PTFE)

Test Example No. 3 (resin prepared by irradiating CD-123E manufactured by AGC Inc. with 0.8 kGy of γ-rays: homo-PTFE)

Test Example No. 4 (resin prepared by irradiating CD-123E manufactured by AGC Inc. with 1.0 kGy of γ-rays: homo-PTFE)

Table 1 shows the heat of fusion of each of the raw materials in the third step.

[Forming Step]

The PTFE powders obtained above were each formed into a tubular shape under the conditions described below.

Examples of the method for molding the powder into a tubular shape include a paste extrusion method and a ram extrusion method described in "Fluororesin handbook (written by Takaomi Satokawa, The Nikkan Kogyo Shimbun, Ltd.)". For Test Example No. 1 to Test Example No. 4, the paste extrusion method was used. The PTFE powder was mixed with 23 parts by mass of a liquid lubricant ("solvent naphtha", manufactured by FUJIFILM Wako Pure Chemical Corporation). The forming was performed by pressing the mixture into a cylindrical shape with a pre-molding machine and subsequently extruding the resulting pre-molded body in the shape of a coil by using an extruder. The temperatures of a cylinder and a die were each 50° C. The extruder used in Test Example Nos. 1 and 2 had a cylinder diameter of 40 mm, a mandrel diameter of 10 mm, a die diameter of 1.0 mm, a core pin diameter of 0.5 mm, and a reduction ratio (R.R.) of 2000. The extruder used in Test Example Nos. 3 and 4 had a cylinder diameter of 30 mm, a mandrel diameter of 10 mm, a die diameter of 0.8 mm, a core pin diameter of 0.4 mm, and a reduction ratio of 1667.

[Drying Step]

In a drying step, the liquid lubricant was dried in a hot-air circulating thermostatic chamber at 200° C.

[Sintering Step]

The tubular formed article was heated at a furnace temperature of 420° C., which was equal to or higher than the melting point of the PTFE or modified PTFE, and sintered at an expansion ratio of 0.9 times by a continuous expansion sintering machine to obtain a translucent nonporous tube.

[Slow-Cooling Step]

The translucent nonporous tube was placed in the hot-air circulating thermostatic chamber in a coiled state and heated at 350° C. for 5 minutes or more and continuously slowly cooled to 300° C. or lower at a cooling rate of −1° C./min or less.

[Expansion Step]

In an expansion step, the resulting nonporous tubular formed article was expanded under the conditions described below to obtain a tubular formed article that was made porous. The expansion was conducted by using a tensile testing machine (Autograph AG500 with a thermostatic chamber, manufactured by Shimadzu Corporation) with a chuck width of 10 mm and at an expansion rate of 500 mm/min and 170° C. The average outer diameter and the average inner diameter were each determined by averaging values measured at two random points. The average thickness was determined by a mathematical formula (average outer diameter−average inner diameter)/2 at two random points.

Table 2 shows the expansion rate, the outer diameter, the inner diameter, and the average thickness of each of the test examples.

<Hollow-Fiber Membrane, Test Example No. 5 to Test Example No. 14 (Comparative Examples)>

PTFE powders below, which were raw material powders, were each mixed with a liquid lubricant (solvent naphtha, manufactured by FUJIFILM Wako Pure Chemical Corporation). The mixture was pressed into a shape and then formed into a tubular shape by paste extrusion molding to prepare a tubular formed body. In this test, 19 parts by mass of the liquid lubricant was blended in No. 5 to No. 8, and 23 parts by mass of the liquid lubricant was blended in Nos. 9 to 14. Each of the extrusion molded articles was heated to 200° C. to remove the liquid lubricant by drying to obtain an unsintered tube. Subsequently, the unsintered tube was expanded in the longitudinal direction at 280° C. to make the unsintered tube porous and then sintered at 380° C. by using a continuous expansion sintering machine. Thus, a porous tubular formed body was produced. Table 1 and Table 2 show the temperature of the die used in the extrusion molding, the expansion ratio in the expansion step, the average outer diameter, the average inner diameter, and the average wall thickness in Test Example No. 5 to Test Example 12.

The raw material resins used in Test Example No. 5 to Test Example No. 14 are as follows.

Test Example No. 5 (CD123E manufactured by AGC Inc.: homo-PTFE)

Test Example No. 6 (CD123E manufactured by AGC Inc.: homo-PTFE)

Test Example No. 7 (CD123E manufactured by AGC Inc.: homo-PTFE)

Test Example No. 8 (CD123E manufactured by AGC Inc.: homo-PTFE)

Test Example No. 9 (CD141E manufactured by AGC Inc.: homo-PTFE)

Test Example No. 10 (CD141E manufactured by AGC Inc.: homo-PTFE)

Test Example No. 11 (CD141E manufactured by AGC Inc.: homo-PTFE)

Test Example No. 12 (F208 manufactured by Daikin Industries, Ltd.: modified PTFE)

Test Example No. 13 (CD123E manufactured by AGC Inc.: homo-PTFE)

Test Example No. 14 (CD123E manufactured by AGC Inc.: homo-PTFE)

Table 1 shows the heat of fusion of each of the raw materials in the third step.

Tables 1 and 2 show the extrusion conditions and the measurement results of the porosity and the isopropanol bubble point of the hollow-fiber membranes of Test Example No. 1 to Test Example No. 12.

TABLE 1

| Hollow-fiber membrane test number | Raw material | Product number (+ irradiation dose) | Heat of fusion in third step | Lubricant (parts by mass) | Extruder dimension (mm) | | | | | Extruder temperature (° C.) | |
|---|---|---|---|---|---|---|---|---|---|---|---|
| | | | | | Cylinder | Mandrel | Die | Core | R.R. | Cylinder | Die |
| No. 1 | Modified PTFE | F208 | 35.0 | 23 | 40 | 10 | 1.0 | 0.5 | 2000 | 50 | 50 |
| No. 2 | Modified PTFE | F208 | 35.0 | 23 | 40 | 10 | 1.0 | 0.5 | 2000 | 50 | 50 |
| No. 3 | PTFE | CD123E + 0.8 kGy | 40.0 | 23 | 30 | 10 | 0.8 | 0.4 | 1667 | 50 | 50 |
| No. 4 | PTFE | CD123E + 1.0 kGy | 45.0 | 23 | 30 | 10 | 0.8 | 0.4 | 1667 | 50 | 50 |
| No. 5 | PTFE | CD123E | 26.0 | 19 | 50 | 20 | 2.5 | 1.2 | 437 | 50 | 50 |
| No. 6 | PTFE | CD123E | 26.0 | 19 | 50 | 20 | 2.5 | 1.2 | 437 | 50 | 80 |
| No. 7 | PTFE | CD123E | 26.0 | 19 | 50 | 20 | 2.5 | 1.2 | 437 | 50 | 115 |
| No. 8 | PTFE | CD123E | 26.0 | 19 | 50 | 20 | 2.5 | 1.2 | 437 | 50 | 50 |
| No. 9 | PTFE | CD141E | 30.2 | 23 | 50 | 20 | 1.7 | 0.8 | 933 | 50 | 80 |
| No. 10 | PTFE | CD141E | 30.2 | 23 | 50 | 20 | 1.7 | 0.8 | 933 | 50 | 80 |
| No. 11 | PTFE | CD141E | 30.2 | 23 | 50 | 20 | 1.7 | 0.8 | 933 | 50 | 80 |
| No. 12 | Modified PTFE | F208 | 35.0 | 23 | 40 | 10 | 1.0 | 0.5 | 2000 | 50 | 50 |
| No. 13 | PTFE | CD123E | 26.0 | 23 | 40 | 10 | 1.0 | 0.5 | 2000 | 50 | 50 |
| No. 14 | PTFE | CD123E | 26.0 | 23 | 30 | 10 | 1.0 | 0.5 | 1067 | 50 | 50 |

TABLE 2

| Hollow-fiber membrane test number | Making nonporous by sintering before expansion | Expansion ratio in axial direction | Average outer diameter (mm) | Average inner diameter (mm) | Average thickness (mm) | Porosity (%) | Bubble point (kPa) |
|---|---|---|---|---|---|---|---|
| No. 1 | Performed | 3.50 | 0.680 | 0.310 | 0.185 | 41 | 500 or more |
| No. 2 | Performed | 5.00 | 0.633 | 0.275 | 0.179 | 54 | 500 or more |
| No. 3 | Performed | 5.00 | 0.300 | 0.150 | 0.075 | 40 | 500 or more |
| No. 4 | Performed | 5.00 | 0.310 | 0.155 | 0.078 | 43 | 500 or more |
| No. 5 | Not performed | 1.87 | 1.770 | 0.840 | 0.465 | 23 | 181 |
| No. 6 | Not performed | 1.87 | 1.720 | 0.820 | 0.450 | 16 | 283 |
| No. 7 | Not performed | 1.87 | 1.680 | 0.820 | 0.430 | 12 | 381 |
| No. 8 | Not performed | 5.10 | 1.580 | 0.840 | 0.370 | 65 | 40 (Leakage through wall) |
| No. 9 | Not performed | 5.35 | 1.070 | 0.720 | 0.175 | 74 | 15 (Leakage through wall) |
| No. 10 | Not performed | 2.12 | 1.270 | 0.760 | 0.255 | 53 | 49 (Leakage through wall) |
| No. 11 | Not performed | 1.74 | 1.250 | 0.770 | 0.240 | 38 | 56 (Leakage through wall) |
| No. 12 | Not performed | Breaking | — | — | — | — | — |
| No. 13 | — | — | — | — | — | — | — |
| No. 14 | Performed | Breaking | — | — | — | — | — |

[Hollow-Fiber Membrane Module (Hollow-Fiber Membrane: Test Example No. 2 and Test Example No. 5 to Test Example No. 7)]

Hollow-fiber membrane modules including the hollow-fiber membranes of Test Example No. 2 and Test Example No. 5 to Test Example No. 7 were produced. As for the hollow-fiber membrane modules including the hollow-fiber membrane of Test Example No. 2, four types of hollow-fiber membrane modules having different packing ratios of hollow-fiber membranes were produced. Table 3 shows the volume of a casing of each hollow-fiber membrane module, the number of hollow-fiber membranes enclosed, and the packing ratio of hollow-fiber membranes.

TABLE 3

| Degassing module | | Effective volume of casing (mL) | Number of hollow-fiber membranes enclosed (membranes) | Packing ratio (%) |
| --- | --- | --- | --- | --- |
| Hollow-fiber membrane test number | No. 2-1 | 16.2 | 214 | 21 |
| | No. 2-2 | 16.2 | 428 | 42 |
| | No. 2-3 | 16.2 | 401 | 39 |
| | No. 2-4 | 16.2 | 535 | 52 |
| | No. 5 | 16.2 | 100 | 76 |

TABLE 3-continued

| Degassing module | Effective volume of casing (mL) | Number of hollow-fiber membranes enclosed (membranes) | Packing ratio (%) |
| --- | --- | --- | --- |
| No. 6 | 16.2 | 100 | 72 |
| No. 7 | 16.2 | 100 | 68 |

[Evaluation of Degassing Performance of Hollow-Fiber Membrane Module]

Pure water having a dissolved oxygen concentration of 6.5 ppm or more was passed through the hollow-fiber membrane module to remove oxygen. Thus, the degassing performance of the hollow-fiber membrane module was evaluated. With regard to pure water after degassing in the case where pure water having a dissolved oxygen concentration of 6.5 ppm or more was supplied, Table 4 shows the relation of a ratio of the amount of pure water supplied per minute to the product of the volume of the casing of the hollow-fiber membrane module and the packing ratio of the hollow-fiber membranes, a dissolved oxygen concentration $y_2$ of pure water after degassing, and a degassing rate $y_1$. Table 5 shows the relation of a ratio of the amount of pure water supplied per minute to the volume of the casing, a dissolved oxygen concentration $y_2$ of pure water after degassing, and a degassing rate $y_1$.

TABLE 4

| | | Amount of pure water supplied (mL/min) | | | | | | | |
| --- | --- | --- | --- | --- | --- | --- | --- | --- | --- |
| | | 83 | | | 60 | | | 34 | |
| | Ratio of amount of pure water supplied | Ratio of supply amount to product of volume and packing ratio (1/min) | Dissolved oxygen concentration after degassing (ppm) | Degassing rate (%) | Ratio of supply amount to product of volume and packing ratio (1/min) | Dissolved oxygen concentration after degassing (ppm) | Degassing rate (%) | Ratio of supply amount to product of volume and packing ratio (1/min) | Dissolved oxygen concentration after degassing (ppm) |
| Hollow-fiber membrane module (Hollow-fiber membrane test number) | No. 2-1 | 24.65 | 6.30 | 10.0 | 17.82 | 6.00 | 14.3 | 10.10 | 5.60 |
| | No. 2-2 | 12.32 | 5.00 | 28.6 | 8.91 | 4.50 | 35.7 | 5.05 | 3.50 |
| | No. 2-3 | 13.15 | 4.60 | 30.3 | 9.51 | 4.10 | 37.9 | 5.39 | 3.40 |
| | No. 2-4 | 9.86 | 3.90 | 40.0 | 7.13 | 3.40 | 47.7 | 4.04 | 2.70 |
| | No. 5 | 6.75 | 6.50 | 0.0 | 4.88 | 6.50 | 0.0 | 2.76 | 6.20 |
| | No. 6 | 7.14 | 5.10 | 21.5 | 5.16 | 5.00 | 23.1 | 2.93 | 4.50 |
| | No. 7 | 7.49 | 5.30 | 18.5 | 5.41 | 5.20 | 20.0 | 3.07 | 5.20 |

| | | Amount of pure water supplied (mL/min) | | | | | |
| --- | --- | --- | --- | --- | --- | --- | --- |
| | | 34 | 15 | | | 10 | |
| | Ratio of amount of pure water supplied | Degassing rate (%) | Ratio of supply amount to product of volume and packing ratio (1/min) | Dissolved oxygen concentration after degassing (ppm) | Degassing rate (%) | Ratio of supply amount to product of volume and packing ratio (1/min) | Dissolved oxygen concentration after degassing (ppm) |
| Hollow-fiber membrane module | No. 2-1 | 20.0 | 4.45 | 3.00 | 57.1 | 2.97 | 2.20 |
| | No. 2-2 | 50.0 | 2.23 | 1.60 | 77.1 | 1.48 | 1.10 |

TABLE 4-continued

| (Hollow-fiber membrane test number) | | | | | | |
|---|---|---|---|---|---|---|
| | No. 2-3 | 48.5 | 2.38 | 1.90 | 71.2 | 1.58 | 1.40 |
| | No. 2-4 | 58.5 | 1.78 | 1.60 | 75.4 | 1.19 | 1.20 |
| | No. 5 | 4.6 | 1.22 | 3.50 | 46.2 | 0.81 | 2.10 |
| | No. 6 | 30.8 | 1.29 | 3.30 | 49.2 | 0.86 | 2.20 |
| | No. 7 | 20.0 | 1.35 | 3.70 | 43.1 | 0.90 | 2.50 |

| | | Amount of pure water supplied (mL/min) | | | | |
|---|---|---|---|---|---|---|
| | | | | 5 | | |
| | | Ratio of amount of pure water supplied | Degassing rate (%) | Ratio of supply amount to product of volume and packing ratio (1/min) | Dissolved oxygen concentration after degassing (ppm) | Degassing rate (%) | Initial stage Dissolved oxygen concentration (ppm) |
| Hollow-fiber membrane module (Hollow-fiber membrane test number) | No. 2-1 | | 68.6 | 1.48 | 1.40 | 80.0 | 7.00 |
| | No. 2-2 | | 84.3 | 0.74 | 0.70 | 90.0 | 7.00 |
| | No. 2-3 | | 78.8 | 0.79 | 1.00 | 84.8 | 6.60 |
| | No. 2-4 | | 81.5 | 0.59 | 1.00 | 84.6 | 6.50 |
| | No. 5 | | 67.7 | 0.41 | 1.60 | 75.4 | 6.50 |
| | No. 6 | | 66.2 | 0.43 | 1.10 | 83.1 | 6.50 |
| | No. 7 | | 61.5 | 0.45 | 1.30 | 80.0 | 6.50 |

TABLE 5

| | | Amount of pure water supplied (mL/min) | | | | | | | |
|---|---|---|---|---|---|---|---|---|---|
| | | 83 | | | 60 | | | 34 | | |
| Ratio of amount of pure water supplied | | Ratio of supply amount to volume (1/min) | Dissolved oxygen concentration after degassing (ppm) | Degassing rate (%) | Ratio of supply amount to volume (1/min) | Dissolved oxygen concentration after degassing (ppm) | Degassing rate (%) | Ratio of supply amount to volume (1/min) | Dissolved oxygen concentration after degassing (ppm) |
| Hollow-fiber membrane module (Hollow-fiber membrane test number) | No. 2-1 | 5.12 | 6.3 | 10.0 | 3.70 | 6.0 | 14.3 | 2.10 | 5.6 |
| | No. 2-2 | 5.12 | 5.0 | 28.6 | 3.70 | 4.5 | 35.7 | 2.10 | 3.5 |
| | No. 2-3 | 5.12 | 4.6 | 30.3 | 3.70 | 4.1 | 37.9 | 2.10 | 3.4 |
| | No. 2-4 | 5.12 | 3.9 | 40.0 | 3.70 | 3.4 | 47.7 | 2.10 | 2.7 |
| | No. 5 | 5.12 | 6.5 | 0.0 | 3.70 | 6.5 | 0.0 | 2.10 | 6.2 |
| | No. 6 | 5.12 | 5.1 | 21.5 | 3.70 | 5.0 | 23.1 | 2.10 | 4.5 |
| | No. 7 | 5.12 | 5.3 | 18.5 | 3.70 | 5.2 | 20.0 | 2.10 | 5.2 |

TABLE 5-continued

| | | | Amount of pure water supplied (mL/min) | | | | |
|---|---|---|---|---|---|---|---|
| | | | 15 | | | 10 | |
| Ratio of amount of pure water supplied | | 34 Degassing rate (%) | Ratio of supply amount to volume (1/min) | Dissolved oxygen concentration after degassing (ppm) | Degassing rate (%) | Ratio of supply amount to volume (1/min) | Dissolved oxygen concentration after degassing (ppm) | Degassing rate (%) |
| Hollow-fiber membrane module (Hollow-fiber membrane test number) | No. 2-1 | 20.0 | 0.93 | 3.0 | 57.1 | 0.62 | 2.2 | 68.6 |
| | No. 2-2 | 50.0 | 0.93 | 1.6 | 77.1 | 0.62 | 1.1 | 84.3 |
| | No. 2-3 | 48.5 | 0.93 | 1.9 | 71.2 | 0.62 | 1.4 | 78.8 |
| | No. 2-4 | 58.5 | 0.93 | 1.6 | 75.4 | 0.62 | 1.2 | 81.5 |
| | No. 5 | 4.6 | 0.93 | 3.5 | 46.2 | 0.62 | 2.1 | 67.7 |
| | No. 6 | 30.8 | 0.93 | 3.3 | 49.2 | 0.62 | 2.2 | 66.2 |
| | No. 7 | 20.0 | 0.93 | 3.7 | 43.1 | 0.62 | 2.5 | 65.1 |

| | | Amount of pure water supplied (mL/min) | | | |
|---|---|---|---|---|---|
| | | 5 | | | |
| Ratio of amount of pure water supplied | | Ratio of supply amount to volume (1/min) | Dissolved oxygen concentration after degassing (ppm) | Degassing rate (%) | Initial stage Dissolved oxygen concentration (ppm) |
| Hollow-fiber membrane module (Hollow-fiber membrane test number) | No. 2-1 | 0.31 | 1.4 | 80.0 | 7.00 |
| | No. 2-2 | 0.31 | 0.7 | 90.0 | 7.00 |
| | No. 2-3 | 0.31 | 1.0 | 84.8 | 6.60 |
| | No. 2-4 | 0.31 | 1.0 | 84.6 | 6.50 |
| | No. 5 | 0.31 | 1.6 | 75.4 | 6.50 |
| | No. 6 | 0.31 | 1.1 | 83.1 | 6.50 |
| | No. 7 | 0.31 | 1.3 | 80.0 | 6.50 |

As shown in Tables 1 and 2, the hollow-fiber membranes of Test Example No. 1 to Test Example No. 4, the hollow-fiber membranes containing a PTFE or a modified PTFE (a polytetrafluoroethylene or a modified polytetrafluoroethylene) as a main component and having a heat of fusion from 296° C. to 343° C. in the third step of 30.0 J/g or more and 45.0 J/g or less had high values in the porosity and the isopropanol bubble point, although the average outer diameter was 1 mm or less and the average inner diameter was 0.5 mm or less. These results show that when the polytetrafluoroethylene or modified polytetrafluoroethylene serving as a main component of a hollow-fiber membrane had a heat of fusion of 30.0 J/g or more and 45.0 J/g or less in the third step, the expansion performance improved and the formation of pores was accelerated, and thus a porous hollow-fiber membrane having a fine hole diameter was formed.

In contrast, with regard to the hollow-fiber membranes of Test Example No. 5 to Test Example No. 11, in which the heat of fusion from 296° C. to 343° C. in the third step was less than 30.0 J/g or exceeding 45.0 J/g, only hollow-fiber membranes having an average outer diameter of 1 mm or more and an average inner diameter of 0.5 mm or more were obtained, and sufficient values were not obtained in the porosity or the isopropanol bubble point.

The hollow-fiber membrane of Test Example No. 12 was produced by using a low-molecular-weight PTFE having a high heat of fusion. Therefore, molecules were unlikely to be entangled and fibrillation was unlikely to occur, and consequently, work hardening was unlikely to occur, and this enabled extrusion in a smaller diameter. However, since the unsintered body was brittle and was not elongated, the unsintered body could not withstand the expansion and was broken.

Since Test Example No. 13 was a high-molecular-weight PTFE having a low heat of fusion, molecules were easily entangled, and fibrillation easily occurred. Therefore, work hardening occurred in the extrusion die, and the flow of the resin tended to be disturbed. In Test Example No. 13, this tendency increased with an increase in the reduction ratio, and the resin was extruded while meandering and twisting. When Test Example No. 13 was extruded as in No. 1 to No. 4, an extruded product was discharged in such a manner that the resin was extruded in a wavy shape in the die. Such an extrusion molded article was strongly oriented. When the extrusion molded article curved with meandering was elongated, cracking occurred. Therefore, the extrusion molded article could not be transferred to the subsequent step.

In Test Example No. 14, extrusion was performed under the same conditions as those in Test Example No. 1 to No. 4 except that a pre-molding cylinder diameter was 29 mm, and an extrusion molding cylinder diameter was 30 mm to obtain a slow-cooling process product (translucent nonporous tube). In Test Example No. 14, extrusion could be performed by increasing the amount of the aid added and decreasing the reduction ratio. However, Test Example No. 14 is a sintered formed body obtained by using a high-molecular-weight PTFE having a low heat of fusion. Accordingly, since the sintered formed body was hard and unlikely to elongate, and the sintered formed body could not withstand the expansion and was broken.

As shown in Table 4, the results show that the hollow-fiber membrane modules (hollow-fiber membrane test No. 2-1 to test No. 2-4) in which when pure water having a dissolved oxygen concentration of 6.5 ppm or more is passed to remove oxygen, the relation between the ratio $x_1$ of the amount of the pure water supplied per minute to the product of the volume of the casing and the packing ratio and the degassing rate $y_1$ satisfies $y_1 \geq -0.093x_1+0.84$ ($0.59 \leq x_1 \leq 5.41$) each have a better performance to remove oxygen dissolved in pure water.

As shown in Table 4, the results show that the hollow-fiber membrane modules (hollow-fiber membrane test No. 2-1 to test No. 2-4) in which when pure water having a dissolved oxygen concentration of 6.5 ppm or more is passed to remove oxygen, the relation between the ratio $x_1$ of the amount of the pure water supplied per minute to the product of the volume of the casing and the packing ratio and the dissolved oxygen concentration $y_2$ satisfies $y_2 \leq 0.64x_1+1.10$ ($0.59 \leq x_1 \leq 5.41$) each have a better performance to remove oxygen dissolved in pure water.

Furthermore, as shown in Table 5, the results show that the hollow-fiber membrane modules (hollow-fiber membrane test No. 2-2 to test No. 2-4) in which the packing ratio of the hollow-fiber membranes to the casing of the hollow-fiber membrane module is 30% or more and 80% or less and when pure water having a dissolved oxygen concentration of 6.5 ppm or more is passed to remove oxygen, the relation between the ratio $x_2$ of the amount of the pure water supplied per minute to the volume of the casing and the degassing rate $y_1$ satisfies $y_1 \geq -0.23x_2+0.88$ ($0.62 \leq x_2 \leq 2.10$) each have a better performance to remove oxygen dissolved in pure water.

As shown in Table 5, the results show that the hollow-fiber membrane modules (hollow-fiber membrane test No. 2-2 to test No. 2-4) in which the packing ratio of the hollow-fiber membranes to the casing of the hollow-fiber membrane module is 30% or more and 80% or less and when pure water having a dissolved oxygen concentration of 6.5 ppm or more is passed to remove oxygen, the relation between the ratio $x_2$ of the amount of the pure water supplied per minute to the volume of the casing and the dissolved oxygen concentration $y_2$ satisfies $y_2 \leq 1.48x_2+0.85$ ($0.62 \leq x_2 \leq 2.10$) each have a better performance to remove oxygen dissolved in pure water.

On the other hand, the hollow-fiber membrane modules including the hollow-fiber membranes of Test Example No. 5 to Test Example No. 7 were inferior to the hollow-fiber membrane modules including the hollow-fiber membrane of Test Example No. 2 in terms of the performance to remove oxygen dissolved in pure water. Accordingly, it is considered that since the hollow-fiber membranes of Test Example No. 5 to Test Example No. 7 did not have a sufficient expansion performance and tended to have large pore diameters, the performance to remove oxygen dissolved in pure water was not obtained.

Regarding the hollow-fiber membranes of Test Example No. 8 to Test Example No. 11, the performance of the modules could not be evaluated because the pure water in inner cavities of the hollow fibers leaked through the walls of the hollow fibers. Regarding the hollow-fiber membranes of Test Example No. 12 to Test Example No. 14, the performance of the modules could not be evaluated because cracking and breaking occurred.

As described above, the results showed that the hollow-fiber membrane described above has a high porosity and a high bubble point while having a reduced hole diameter. The results also showed that a hollow-fiber membrane module including the hollow-fiber membrane is particularly excellent in terms of degassing performance.

REFERENCE SIGNS LIST 1 hollow-fiber membrane
2 membrane member
3 hollow-fiber membrane module
4 first sealing portion
5 second sealing portion
7 liquid supply opening
8 liquid discharge opening
9 gas nozzle
11 casing
12 first sleeve
13 first cap
14 second sleeve
15 second cap

The invention claimed is:
1. A hollow-fiber membrane comprising:
a polytetrafluoroethylene or a modified polytetrafluoroethylene as a main component,
wherein the hollow-fiber membrane has an average outer diameter of 1 mm or less and an average inner diameter of less than 0.3 mm,
the hollow-fiber membrane has an isopropanol bubble point of 1,000 kPa or more, and
in a measurement, with a differential scanning calorimeter, of a heat of fusion of the polytetrafluoroethylene or the modified polytetrafluoroethylene having been subjected to a first step of heating, a second step of cool, and a third step of cool, when the polytetrafluoroethylene or the modified polytetrafluoroethylene is subjected to i) the first step of heating from room temperature to 245° C. at a rate of 50° C./min and subsequently heating from 245° C. to 365° C. at a rate of 10° C./min, ii) the second step of cooling from 365° C. to 350° C. at a rate of −10° C./min, maintaining the temperature, subsequently cooling from 350° C. to 330° C. at a rate of −10° C./min, and further cooling from 330° C. to 305° C. at a rate of −1° C./min, and iii) the third step of cooling from 305° C. to 245° C. at a rate of −50° C./min and subsequently heating from 245° C. to 365° C. at a rate of 10° C./min, the heat of fusion of the polytetrafluoroethylene or the modified polytetrafluoroethylene from 296° C. to 343° C. in the third step is 30.0 J/g or more and 45.0 J/g or less.
2. The hollow-fiber membrane according to claim 1, wherein the hollow-fiber membrane has a porosity of 30% or more.

3. A hollow-fiber membrane module capable of removing a gas dissolved in a liquid, the hollow-fiber membrane module comprising:
a casing; and
a plurality of hollow-fiber membranes aligned in one direction, the hollow-fiber membranes each being the hollow-fiber membrane according to claim 1,
wherein a packing ratio of the hollow-fiber membranes to the casing is 15% or more and 80% or less.

4. A hollow-fiber membrane module capable of removing a gas dissolved in a liquid, the hollow-fiber membrane module comprising:
a casing; and
a plurality of hollow-fiber membranes aligned in one direction, the hollow-fiber membranes each being a hollow-fiber membrane comprising:
a polytetrafluoroethylene or a modified polytetrafluoroethylene as a main component,
wherein the hollow-fiber membrane has an average outer diameter of 1 mm or less and an average inner diameter of 0.5 mm or less, and
in a measurement, with a differential scanning calorimeter, of a heat of fusion of the polytetrafluoroethylene or the modified polytetrafluoroethylene having been subjected to a first step of heating, a second step of cool, and a third step of cool, when the polytetrafluoroethylene or the modified polytetrafluoroethylene is subjected to i) the first step of heating from room temperature to 245° C. at a rate of 50° C./min and subsequently heating from 245° C. to 365° C. at a rate of 10° C./min, ii) the second step of cooling from 365° C. to 350° C. at a rate of −10° C./min, maintaining the temperature, subsequently cooling from 350° C. to 330° C. at a rate of −10° C./min, and further cooling from 330° C. to 305° C. at a rate of −1° C./min, and iii) the third step of cooling from 305° C. to 245° C. at a rate of −50° C./min and subsequently heating from 245° C. to 365° C. at a rate of 10° C./min, the heat of fusion of the polytetrafluoroethylene or the modified polytetrafluoroethylene from 296° C. to 343° C. in the third step is 30.0 J/g or more and 45.0 J/g or less,
wherein a packing ratio of the hollow-fiber membranes to the casing is 15% or more and 80% or less, and
wherein when pure water having a dissolved oxygen concentration of 6.5 ppm or more is passed to remove oxygen, a relation between a ratio $x_1$ of an amount of the pure water supplied per minute to a product of a volume of the casing and the packing ratio and a degassing rate $y_1$ satisfies formula (1) below:

$$y_1 \geq -0.093x_1 + 0.84 \quad (1)$$

(where, in formula (1), $0.59 \leq x_1 \leq 5.41$).

5. A hollow-fiber membrane module capable of removing a gas dissolved in a liquid, the hollow-fiber membrane module comprising:
a casing; and
a plurality of hollow-fiber membranes aligned in one direction, the hollow-fiber membranes each being a hollow-fiber membrane comprising:
a polytetrafluoroethylene or a modified polytetrafluoroethylene as a main component,
wherein the hollow-fiber membrane has an average outer diameter of 1 mm or less and an average inner diameter of 0.5 mm or less, and
in a measurement, with a differential scanning calorimeter, of a heat of fusion of the polytetrafluoroethylene or the modified polytetrafluoroethylene having been subjected to a first step of heating, a second step of cool, and a third step of cool, when the polytetrafluoroethylene or the modified polytetrafluoroethylene is subjected to i) the first step of heating from room temperature to 245° C. at a rate of 50° C./min and subsequently heating from 245° C. to 365° C. at a rate of 10° C./min, ii) the second step of cooling from 365° C. to 350° C. at a rate of −10° C./min, maintaining the temperature, subsequently cooling from 350° C. to 330° C. at a rate of −10° C./min, and further cooling from 330° C. to 305° C. at a rate of −1° C./min, and iii) the third step of cooling from 305° C. to 245° C. at a rate of −50° C./min and subsequently heating from 245° C. to 365° C. at a rate of 10° C./min, the heat of fusion of the polytetrafluoroethylene or the modified polytetrafluoroethylene from 296° C. to 343° C. in the third step is 30.0 J/g or more and 45.0 J/g or less,
wherein a packing ratio of the hollow-fiber membranes to the casing is 15% or more and 80% or less, and
wherein when pure water having a dissolved oxygen concentration of 6.5 ppm or more is passed to remove oxygen, a relation between a ratio $x_1$ of an amount of the pure water supplied per minute to a product of a volume of the casing and the packing ratio and a dissolved oxygen concentration $y_2$ satisfies formula (2) below:

$$y_2 \leq 0.64x_1 + 1.10 \quad (2)$$

(where, in formula (2), $0.59 \leq x_1 \leq 5.41$).

6. A hollow-fiber membrane module capable of removing a gas dissolved in a liquid, the hollow-fiber membrane module comprising:
a casing; and
a plurality of hollow-fiber membranes aligned in one direction, the hollow-fiber membranes each being a hollow-fiber membrane comprising:
a polytetrafluoroethylene or a modified polytetrafluoroethylene as a main component,
wherein the hollow-fiber membrane has an average outer diameter of 1 mm or less and an average inner diameter of 0.5 mm or less, and
in a measurement, with a differential scanning calorimeter, of a heat of fusion of the polytetrafluoroethylene or the modified polytetrafluoroethylene having been subjected to a first step of heating, a second step of cool, and a third step of cool, when the polytetrafluoroethylene or the modified polytetrafluoroethylene is subjected to i) the first step of heating from room temperature to 245° C. at a rate of 50° C./min and subsequently heating from 245° C. to 365° C. at a rate of 10° C./min, ii) the second step of cooling from 365° C. to 350° C. at a rate of −10° C./min, maintaining the temperature, subsequently cooling from 350° C. to 330° C. at a rate of −10° C./min, and further cooling from 330° C. to 305° C. at a rate of −1° C./min, and iii) the third step of cooling from 305° C. to 245° C. at a rate of −50° C./min and subsequently heating from 245° C. to 365° C. at a rate of 10° C./min, the heat of fusion of the polytetrafluoroethylene or the modified polytetrafluoroethylene from 296° C. to 343° C. in the third step is 30.0 J/g or more and 45.0 J/g or less,
wherein a packing ratio of the hollow-fiber membranes to the casing is 15% or more and 80% or less, wherein the packing ratio of the hollow-fiber membranes to the casing is 30% or more and 80% or less, and when pure water having a dissolved oxygen concentration of 6.5 ppm or more is passed to remove oxygen, a relation between a ratio $x_2$ of an amount of the pure water supplied per minute to a volume of the casing and a degassing rate $y_1$ satisfies formula (3) below:

$$y_1 \geq -0.23x_2 + 0.88 \tag{3}$$

(where, in formula (3), $0.62 \leq x_2 \leq 2.10$).

7. A hollow-fiber membrane module capable of removing a gas dissolved in a liquid, the hollow-fiber membrane module comprising:

a casing; and a plurality of hollow-fiber membranes aligned in one direction, the hollow-fiber membranes each being a hollow-fiber membrane comprising:

a polytetrafluoroethylene or a modified polytetrafluoroethylene as a main component, wherein the hollow-fiber membrane has an average outer diameter of 1 mm or less and an average inner diameter of 0.5 mm or less, and in a measurement, with a differential scanning calorimeter, of a heat of fusion of the polytetrafluoroethylene or the modified polytetrafluoroethylene having been subjected to a first step of heating, a second step of cool, and a third step of cool, when the polytetrafluoroethylene or the modified polytetrafluoroethylene is subjected to i) the first step of heating from room temperature to 245° C. at a rate of 50° C./min and subsequently heating from 245° C. to 365° C. at a rate of 10° C./min, ii) the second step of cooling from 365° C. to 350° C. at a rate of −10° C./min, maintaining the temperature, subsequently cooling from 350° C. to 330° C. at a rate of −10° C./min, and further cooling from 330° C. to 305° C. at a rate of −1° C./min, and iii) the third step of cooling from 305° C. to 245° C. at a rate of −50° C./min and subsequently heating from 245° C. to 365° C. at a rate of 10° C./min, the heat of fusion of the polytetrafluoroethylene or the modified polytetrafluoroethylene from 296° C. to 343° C. in the third step is 30.0 J/g or more and 45.0 J/g or less, wherein a packing ratio of the hollow-fiber membranes to the casing is 15% or more and 80% or less, wherein the packing ratio of the hollow-fiber membranes to the casing is 30% or more and 80% or less, and when pure water having a dissolved oxygen concentration of 6.5 ppm or more is passed to remove oxygen, a relation between a ratio $x_2$ of an amount of the pure water supplied per minute to a volume of the casing and a dissolved oxygen concentration $y_2$ satisfies formula (4) below:

$$y_2 \leq 1.48x_2 + 0.85 \tag{4}$$

(where, in formula (4), $0.62 \leq x_2 \leq 2.10$).

* * * * *